United States Patent [19]

Reisner

[11] 4,155,582

[45] May 22, 1979

[54] HANDLE ACCESSORY FOR WORK TOOLS

[76] Inventor: Robert J. Reisner, 1624 N. Kilbourn Ave., Chicago, Ill. 60639

[21] Appl. No.: 892,650

[22] Filed: Apr. 3, 1978

[51] Int. Cl.² .............................................. A01B 1/22
[52] U.S. Cl. .................................................... 294/58
[58] Field of Search .................... 294/58; 16/114, 115, 16/112; 224/52; 37/53; D8/1; 30/260

[56] References Cited

U.S. PATENT DOCUMENTS

| | | | |
|---|---|---|---|
| 1,083,054 | 12/1913 | Brown | 294/58 |
| 3,155,414 | 11/1964 | Bales | 294/58 |
| 3,751,094 | 8/1973 | Bohler | 294/58 |
| 3,830,416 | 8/1974 | Smedley | 224/52 |

*Primary Examiner*—James B. Marbert
*Attorney, Agent, or Firm*—Robert E. Wagner; Gerald T. Shekleton

[57] ABSTRACT

A lightweight handle accessory particularly adapted to be mounted on the generally straight shaft of a work tool or other working or sporting implements, having a clamping portion partially surrounding the shaft or other surface to be gripped which cooperates with a flexible fastening means of variable diameter to frictionally engage the shaft and fixedly mount the handle accessory. A handle is mounted near the outward end of opposing lever arms to enable the operator to grip the assembly. The underside of the gripping portion is serrated and divided into mirror images with a central slot which allows flexing of the gripping portion to adapt to a wide variety of mounting surface sizes and tapers. The flexible fastening means may be easily disengaged from one shaft or implement and remounted on another differently sized shaft or implement without loss of holding power.

12 Claims, 18 Drawing Figures

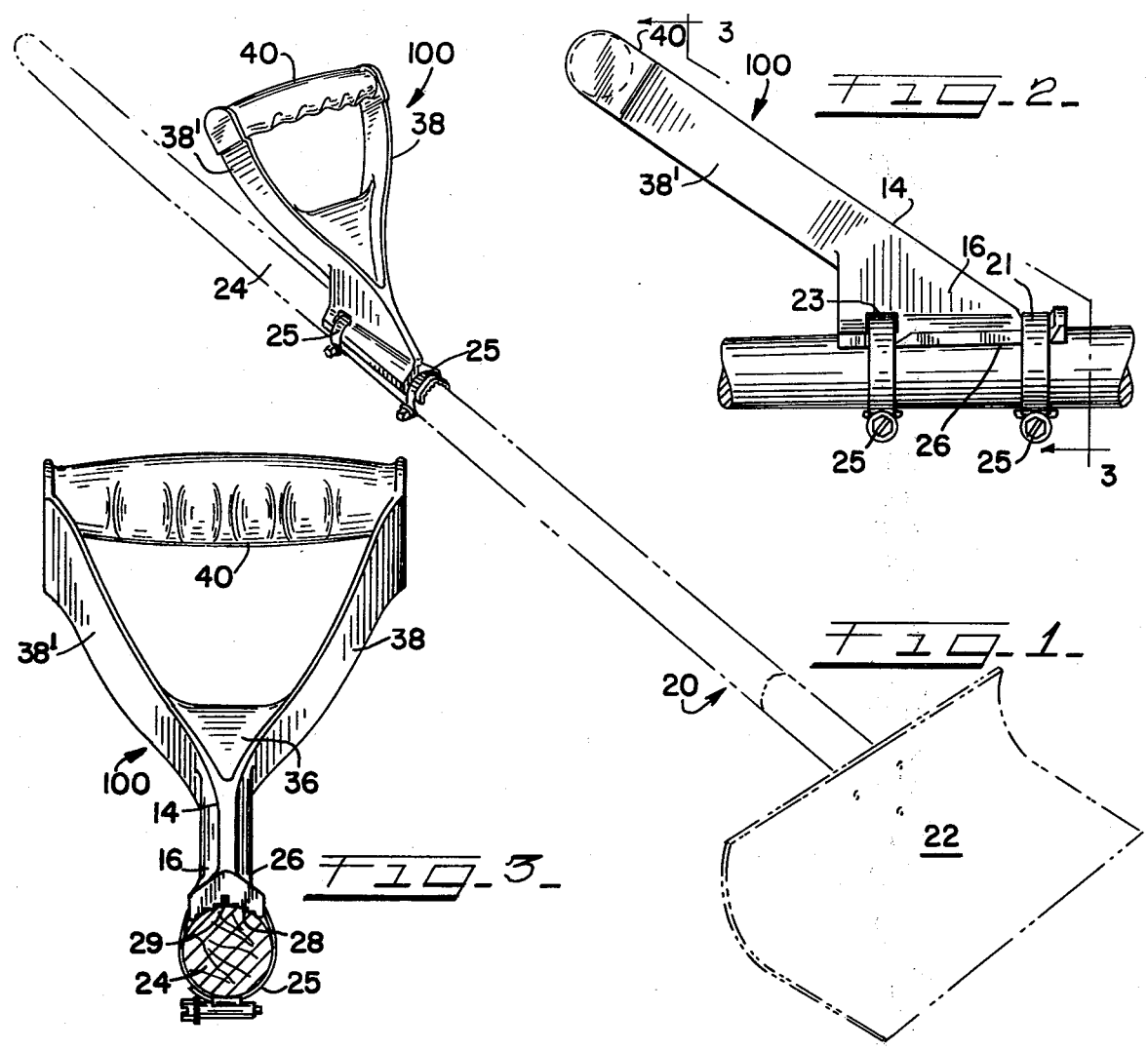
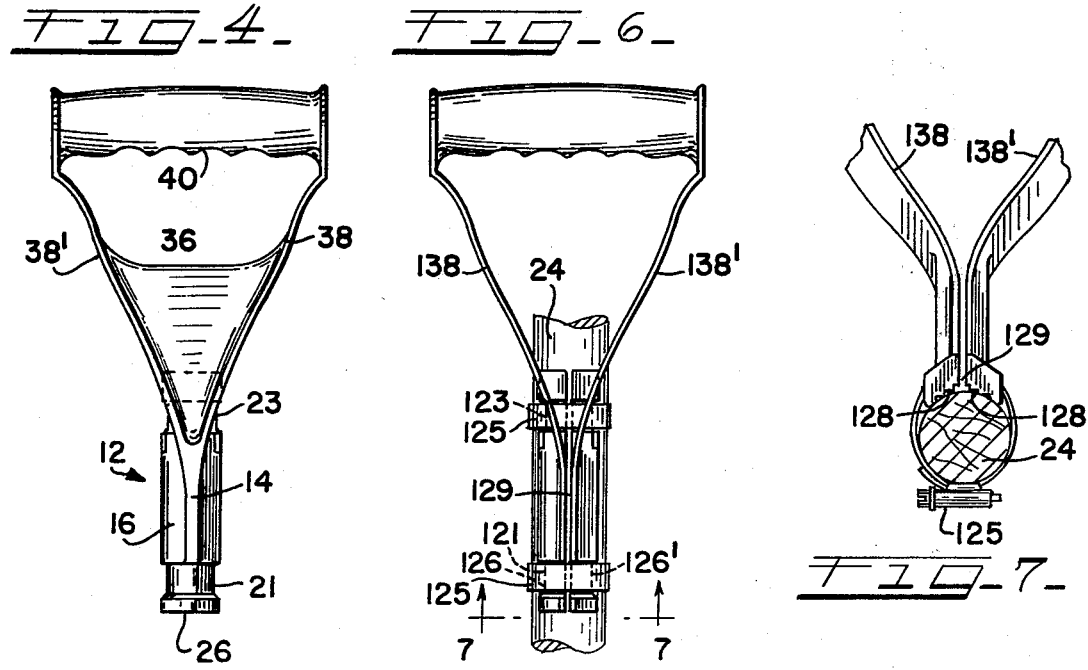

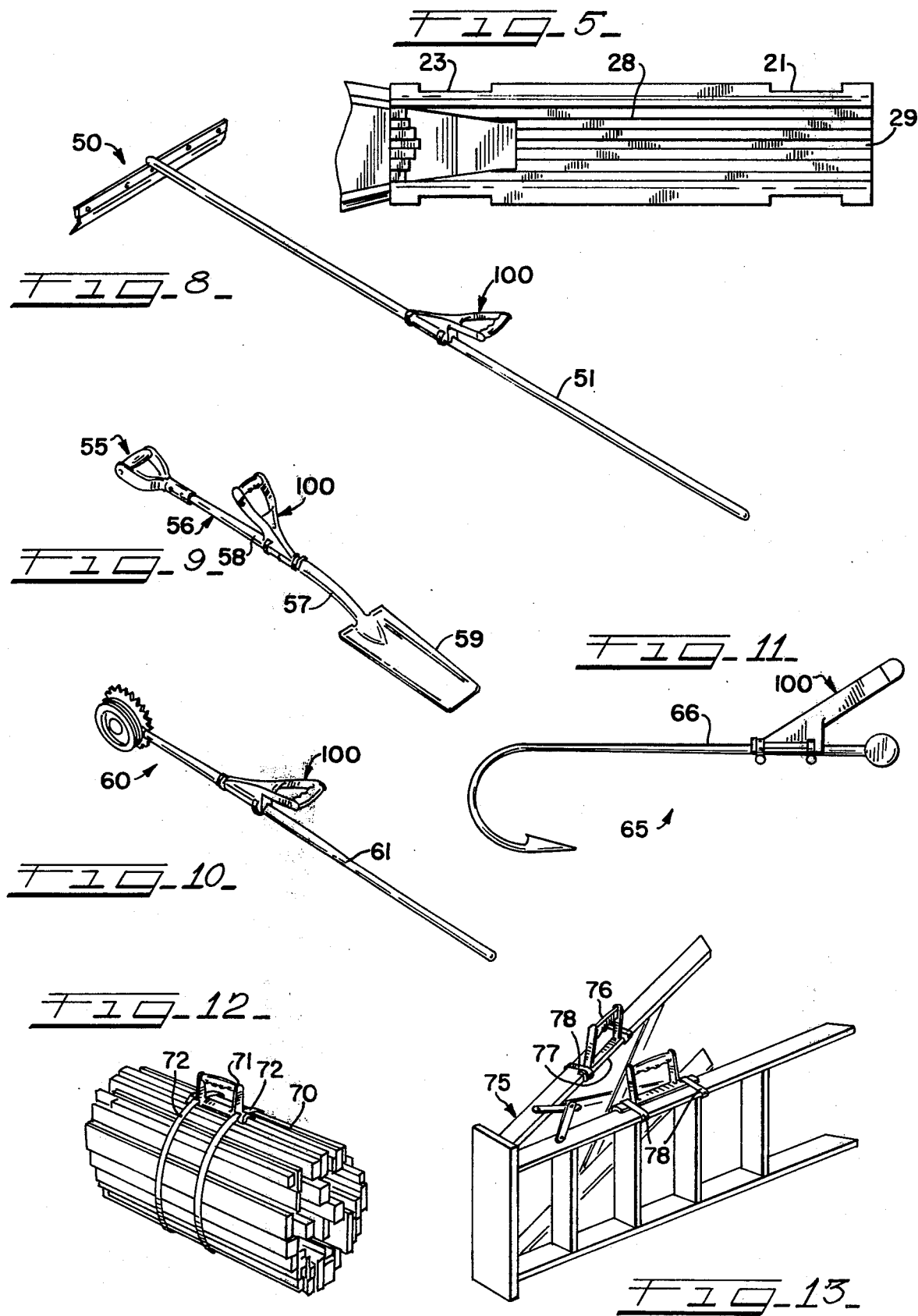

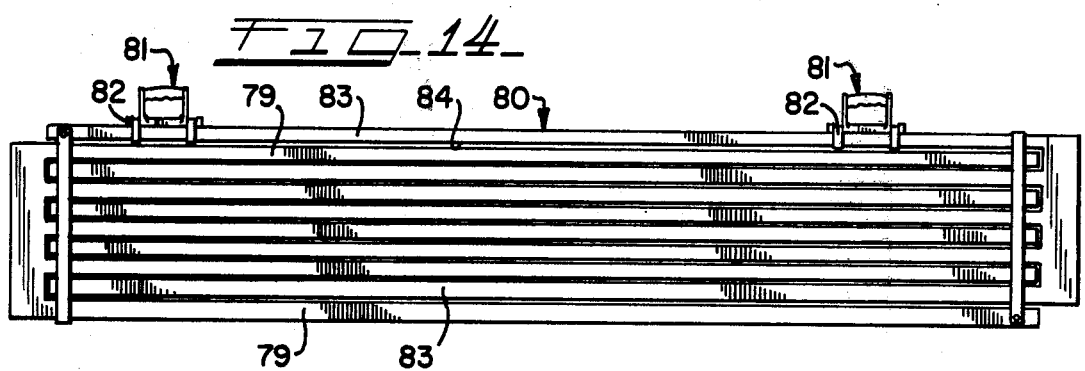
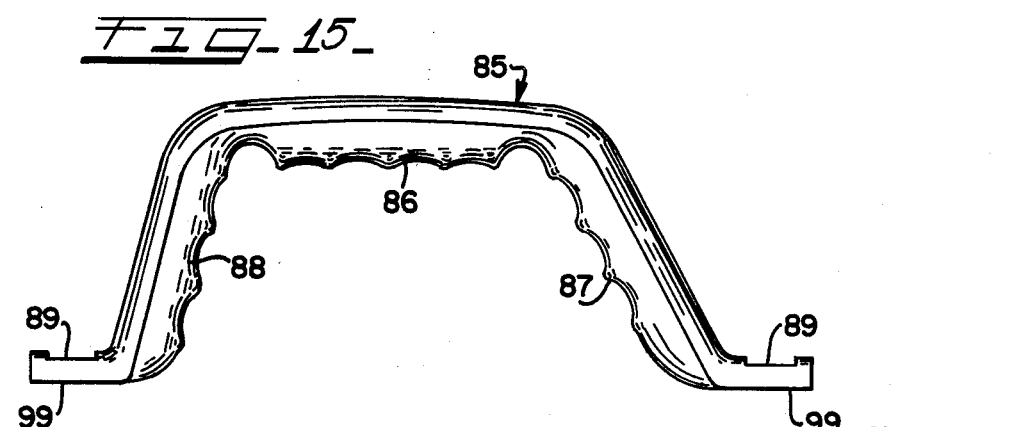
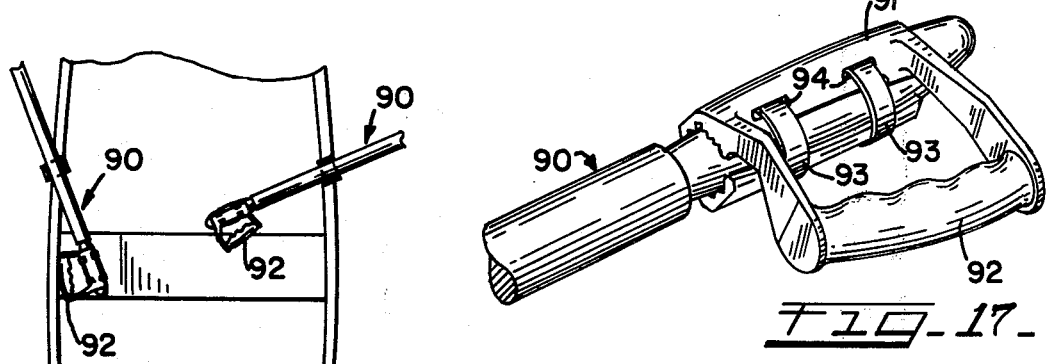
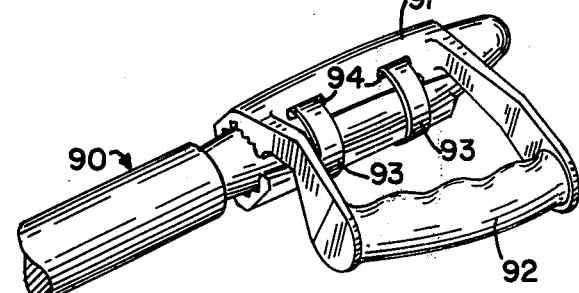
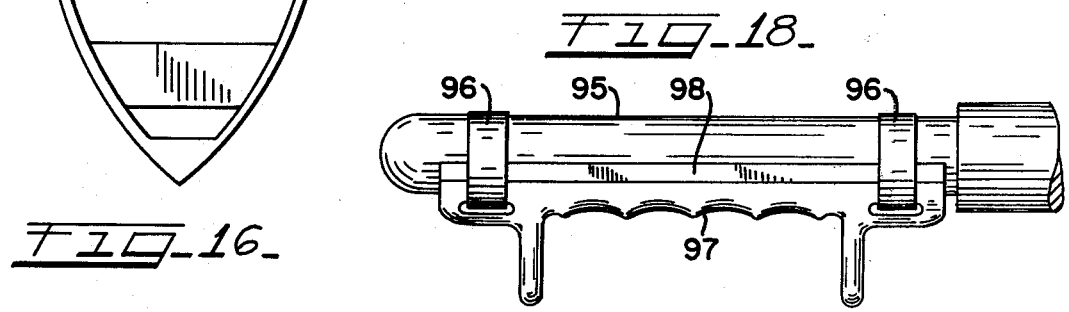

HANDLE ACCESSORY FOR WORK TOOLS

BACKGROUND OF THE INVENTION

This invention relates to work tools in general, and, in particular, to a handle which may be easily and quickly mounted on a conventional straight shaft type handle of a yard or garden tool, as well as other implements, to assist in the operation of the tool.

Various types of implements are used in connection with outdoor work in a typical household. Most such work tools consist of a tool portion or head and an elongated member such as a shaft which is formed in a generally cylindrical configuration for easy gripping. Examples of such implements are hoes, rakes, shovels, spades, snow shovels and so on. Most of these tools are used in the moving or lifting of materials such as soil, sand or snow, which, depending on current climatic conditions and composition, vary in their weight, but in general, tend to require substantial effort from an average person to move. Moreover, since the average person is not daily engaged in so handling such materials, the effort used in moving and lifting such material often produces physical strain symptomized by back and shoulder aches. Such strain results because, in moving a work tool such as a snow shovel forward, or lifting the snow with the shovel, it is usually required that one hand of the operator be placed adjacent the distal or upward end of the shaft, while the other hand is placed toward the middle or lower portion of the handle. This positioning is required in order to gain sufficient leverage to lift or move the weight carried by the tool portion. In so placing the hands, however, the weight of the material on the tool portion is transferred through the arms and into the shoulders while the lower back portion of the operator is severely bent. This is, at the least, uncomfortable, and may often produce severe fatigue and strain in the back area and serious medical problems.

DESCRIPTION OF THE INVENTION

Previous efforts to solve these problems, as exemplified in U.S. Design Pat. No. 237,350, provided a detachable handle assembly which was attached to the shaft portion of a conventional work tool as an accessory to provide a means and point for gripping the tool easily without excessive bending and through which an additional force might be exerted axially along the shaft of the tool to assist in pushing, pulling or lifting the tool. This handle reduced the physical disadvantages of conventional, generally straight shafted tools with an integral handle having a bracket clamping portion mounted over and encircling the shaft of the conventional work tool and tightened by nut and bolt so that it frictionally engaged the exterior surface of the shaft to mount the handle on the shaft. The handle arm means extends outwardly at an acute angle to the shaft and the gripping handle is mounted on the outward end of the lever arm means. The structure of this handle extends the gripping point of the tool upward from the shaft and rearward toward the operator and eliminates excessive bending by the operator and consequently relieves a considerable amount of the stress on the shoulders and lower back normally occurring in the use of most tools today.

However, a problem presented itself when it became necessary to adapt such a handle to work tools having shafts with large differences in diameters. A particular problem arose when it was desired to place such a handle accessory on a tapered portion of the shaft. Due to the rigidity of the attaching portion, it would not readily conform to the shaft taper, and the grip of the attachment was weakened. Such a handle was also limited to use with tools having straight shafts.

SUMMARY OF THE INVENTION

The subject invention provides a means by which a handle accessory may be used with a work tool having any commercially available shaft and may also be adapted for use in a variety of other manners to lessen or make easier the carrying of a load or manipulation of a utensil. In one embodiment the handle is integrally attached to a mounting portion at an acute angle so as to be conducive to muscle utilization in the use of a work tool rather than the involvement of the back, which can lead to back strain. The mounting portion comprises one or more lengths of a shaft engaging section or fastening means. The shaft-engaging section has serrations or ridges on the side adjacent the shaft. A central slot or channel in this section allows flexibility in the section for conformance to shafts of various diameters while the serrations provide a firm grip on the shaft to assure a fixed position on the shaft. Two or more flexible adjustable fastening straps encircle and fixedly attach the shaft-engaging section and the handle accessory to the shaft at any desired point. In other embodiments, the handle is oriented as necessary to the utilization of the particular utensil or use for which it is intended. The flexible strap and the serrations on the underside of the handle mounting portion fixedly locate the handle where desired for maximum efficiency.

Accordingly, it is an object of the present invention to provide a handle accessory for work tools which is easily mounted on the shaft of a conventional work tool or sporting utensil and substantially reduce the physical strain and stress on the tool operator during use of the tool, or utensil.

It is also an object of this invention to provide a handle accessory for work tools which may be mounted at any point along a straight or tapered shaft of a conventional work tool and is oriented with respect to this shaft so that a force exerted on this handle will have a component acting axially along the shaft of the tool to assist in the movement of the tool.

It is another object of this invention to provide a handle accessory for a work tool which may be easily and inexpensively formed in an integral shape and quickly and easily mounted on a tool shaft or transferred from the shaft of one tool to another.

A further object of the subject invention is a handle accessory which is adaptable for use with a wide variety of tools and implements and is easily interchanged from one tool to another.

These and other important objects of this invention will become apparent from the following description taken in conjunction with the drawings illustrating a preferred embodiment wherein:

FIG. 1 shows one embodiment of the handle accessory on a work tool, such as a snow shovel, shown in hidden lines for purposes of illustration only;

FIG. 2 is a side elevational view of the handle accessory shown in FIG. 1;

FIG. 3 is a cross-sectional view of the handle accessory shown in FIG. 1 taken along the lines 3—3 of FIG. 2;

FIG. 4 is a top plan view of the handle accessory shown in FIG. 1;

FIG. 5 is a bottom plan view of the handle accessory of FIG. 1;

FIG. 6 is a top plan view of a second embodiment of a handle accessory having more than one shaft-engaging portion;

FIG. 7 is a cross-sectional view of the handle accessory shown in FIG. 6, taken along the line 7—7;

FIG. 8 is a perspective view of an embodiment of the handle accessory of the subject invention as used on a cement finisher's trowel;

FIG. 9 is a perspective view of an embodiment of the handle accessory of the subject invention as used on a spade;

FIG. 10 is a perspective view of an embodiment of the handle accessory of the subject invention as used on a lawn edge;

FIG. 11 is a perspective view of an embodiment of the handle accessory of the subject invention as used on a gaff hook;

FIG. 12 is a perspective view of an embodiment of the handle accessory of the subject invention as used to carry a bundle of wood;

FIG. 13 is a perspective view of an embodiment of the handle accessory of the subject invention as used to carry a stepladder;

FIG. 14 is a side view of an embodiment of the handle accessory of the subject invention as used to carry scaffolding;

FIG. 15 is a side view of another embodiment of the subject invention showing different gripping portions in the handle for greater adaptation to tools, shafts and implements of various sizes and requirements;

FIG. 16 is a partial top plan view of a rowboat employing a handle accessory of the subject invention on the oars;

FIG. 17 is a side view showing a handle grip according to the subject invention on a shaft of an implement such as a wheelbarrow;

FIG. 18 is a side view of an embodiment of the subject invention showing the handle accessory for an oar as in FIG. 16 in greater detail.

Referring now to the drawings and, in particular, to FIG. 1, the handle accessory of this invention is shown in general at 10. This handle accessory 10 is shown mounted in one possible position on a work tool 20 shown in hidden lines by a push-type snow shovel. This work tool 20 has a tool portion 22 and a generally straight shaft 24 on which the handle accessory 10 is mounted. It is easily appreciated that because of the shape of the tool portion 22 of shovel 20, a person using this tool would have to move the handle portion 24 close to the ground or shoveling surface in order to gain sufficient leverage to push a quantity of snow. Moreover, if the person attempted to lift the snow laying on the tool portion 22, one of his hands would have to be placed on the straight shaft 24 near the tool portion 22. Both of these maneuvers require the operator to bend over, thus placing severe stresses on his lower back. To reduce this bending and assist in lifting, the handle accessory 10 is mounted at a convenient point along the shaft 24 of the work tool 20 as determined by the height and/or strength and comfort of the individual operator.

The handle accessory 10 is uniquely constructed so that is may be quickly and easily but securely mounted on the handle 24, and yet just as quickly removed and transferred to the straight shaft of another work tool.

This handle 10 is formed of a semi-rigid plastic, such as a fiberglass impregnated polymer of nylon or the like which imparts great strength and some rigidity while allowing sufficient flexibility to allow substantially complete conformance to the handle taper. The subject invention includes a clamping bracket portion 12 having an upper stem portion 14, as shown in FIGS. 5 and 6, and a lower mounting portion 16 which may comprise, in one embodiment, a generally V-shaped shaft-engaging section 26 for engaging the shaft 24, one side being a mirror image of the other.

As shown in FIG. 5, this shaft-engaging section 26 has a series of serrations or ridges 28 formed into the side adjacent the shaft 24 for providing a strong grip of the section 26 on the shaft when brought into biased contact with the shaft 24. In the preferred embodiment these serrations comprise a plurality of rectangular steps running parallel to the axis of the shaft when in position. A central channel or slot 29, preferably rectangular in shape, permits a limited and controlled amount of flexibility of the shaft-engaging section 26, so that the handle accessory might conform to many shaft sizes, as desired. The serrations may also run perpendicular to the axis of the shaft or comprise a diagonal crosshatch, as desired.

The front and rear portions of the mounting portion 16 of the handle accessory have indentations 21 and 23 formed therein. Either indentation may comprise, as shown in FIG. 2 for the rear indentation 23, an opening through the mounting portion. Flexible adjustable clamps or straps 25 are seated in the indentations 21 and 23, secured about the shaft and screws tightened to bias the mounting portion and the entire handle accessory into the shaft. The indentations allow the strap 25 better conformance to the shaft circumference. Since each strap 25 is adjustable to a desired diameter by the simple tightening of a screw and, since the flexibility of the shaft-engaging section allows substantial conformance of the section 26 to the taper of the shaft, the handle may be attached at practically any point on the shaft 24 regardless of the degree of taper of the shaft. The shaft-engaging portion is thus capable of conforming to variances in diameter from front to rear while retaining substantial contact throughout the shaft circumference. The serrations, being biased against the shaft throughout their length, caused by the conformance of sections 26 to the shaft can effectively grip the shaft and prevent slippage or twisting of the entire handle accessory on the shaft. In addition, the amount of force necessary to bias the shaft-engaging section 26 against shaft 24 throughout the length of the section 26 may be easily supplied by the flexible, variable strap used, since such a strap 25 applies an equally distributed amount of inwardly directed force about the shaft circumference, and in addition will conform very well to the slightly oval shape occurring with the addition of section 26 to the handle, all contributing to a greater gripping power.

By its conformance to as much of the shaft as possible, the strap also can absorb and distribute more shock and stress over a larger shaft area to reduce chances of slippage or the like. In addition, different shaft shapes are easily tolerated and gripped, as with a shaft which is hexagonal when viewed in cross section.

Since the flexibility of the strap allows conformance to a wide variety of shaft diameters, the strap may be easily removed from a shaft on one size and secured on a shaft of a different size. This capability makes possible the quick and easy transfer of a handle accessory from one tool to another without any loss in handle gripping power.

The stem portion 14 is preferably integrally formed with or joined to a generally V-shaped lever arm or yoke portion 36. This yoke portion 36 extends upwardly from the stem 14 of the mounting portion 16 and is disposed at an acute angle with respect to the central axis of the shaft-engaging section 16 of clamping bracket 12. Since the central axis of the shaft-engaging section 16 will be generally concentric with the central axis of shaft 24, the yoke portion will be joined to shaft 24 at this same acute angle. At the opposite end of the lever arm 36 from the stem 14 are two generally parallel ears 38 and 38' which are formed at the distal ends of each member of the lever arm portion. Between these ears is mounted a gripping handle 40, which is preferably circular in configuration to allow for easy gripping. This gripping handle 40 may be mounted by any suitable fastening means, such as a box nail or pin inserted through an opening formed in each ear and into and along the central axis of the gripping handle 40, or it may be formed in one piece with the yoke portion 36 and shaft-engaging section as shown in FIGS. 3 and 4.

The particular configuration of the handle accessory 10 which provides the unique advantages set forth above is well illustrated in FIG. 2. In that figure, it is seen that if any imaginary central axis is drawn through the center of the mounting portion 16, the main portion of each of the split members of the lever arm portion 36, including ears 38 and 38', would be disposed at an acute angle to this imaginary central axis. Since mounting portion 16 is mounted substantially concentrically over the straight shaft 24 of a tool, as shown in FIG. 1, it follows that lever arm 36 will also be disposed at an acute angle with respect to the central axis of the shaft of such a tool. Therefore, any force exerted by the operator on the gripping handle 40 of the handle accessory 10 will, despite the direction of such force, be transmitted along the lever arm 36 at an angle to the central axis of the shaft of the tool. Thus, a vectorial component of this force will always, because of the angle of lever arm 36 of handle 10 through which it is applied relative to the shaft, have a component which is directed along or parallel to the central axis of the tool shaft so that any forward or rearward movement of the shovel will always be greatly assisted by the application of a force at the gripping point 40 of the handle 10.

Moreover, the handle accessory 10, by its construction, moves the point of gripping the straight shaft 24 of tool 20 upward above the shaft and also rearward toward the operator. This enables the operator to grip the shaft of the tool as required to lift it or push it in a normal manner, yet because the point of gripping has been moved outward from the shaft and backward, eliminated the excessive bending which often produces physical injury or fatigue.

In another embodiment of the subject invention, as shown in FIGS. 6 and 7, the lever arms 138 and 138' do not join, but rather are each attached to a separate shaft-engaging section 126 and 126'. Each shaft-engaging section has indentations 121 and 123 which provide a seat for the adjustable clamp 125. Both sections 126 and 126' are secured to the shaft by the flexible adjustable strap 125 within the indentations 121 and 123. Serrations 128 and channels 129 may be provided on the shaft-engaging side of each section 126 and 126' for gripping power and conformance of each section to differently tapered shafts of different diameters. As with the embodiment shown in FIG. 1, the indentations 121 and 123 allow the adjustable strap to be drawn tight for engaging more shaft surface for greater gripping power.

Alternate embodiments of the subject invention as depicted in FIGS. 8-18 show that, using the mounting portion of the subject invention, many vastly different tools and implements can benefit from handle accessories formed according to the invention. For example, FIG. 8 is a cement finisher's trowel 50, and generally has a long tubular shaft 51 with no taper and a small diameter, as no loads are lifted with the trowel 50. The handle accessory 10 can easily be fitted onto the shaft 51 in such a manner that the pushing and pulling of the trowel will not dislodge it or cause it to slide up or down the shaft 51.

FIG. 9 is a spade 55, having the handle accessory 10 of the subject invention affixed to the shaft 56. Generally, spade shafts comprise, as shown in FIG. 9, a metal portion 57, usually integral with the scoop portion of the shovel and a wooden shaft for use in manipulating the shovel. Even though these shafts often will have tapers of opposite directions, the handle accessory 10 of the subject invention can still be tightly affixed to the shaft 56 so that it will remain in place during shoveling operations. As set forth above, the shaft-engaging section 26 (FIG. 2) is conformed to the shaft surface by the flexible straps, for maximum contact of the serrations 28 on the shaft surface.

The lawn edger 60 shown in FIG. 10 has the handle accessory 100 of the subject invention attached to the tapered shaft 61. The same handle accessory 100 may also be placed on a gaff hook 65 (FIG. 11). Even though the shaft diameter of the lawn edger 60 and the gaff hook might differ by as much as ¾ inch, the contact of the serrations on the surface of each shaft is great enough to assure a stationary grip on each so that there will be no movement under stress.

With changes in the handle portion, the handle accessory of the subject invention may be used as an aid in carrying various bulky and clumsy loads. For instance, FIG. 12 shows a bundle of lumber 70 which may be carried to a job site in a more efficient and easier manner by the handle accessory 71 which, through the flexible straps 72 is rigidly mounted on the bundle 70. The size of the bundle which may be carried is limited only by the strength of the person carrying it, as flexible straps can be provided in all sizes, each adjustable to fit the bundle size to be carried.

The same handle accessory 71 shown in FIG. 12 may also be used to carry ladders. However, for better gripping of the ladder and for more positive assurances of holding power, handle accessory 76 may be used, where the ladder engaging side of the handle mounting portion is in complete engagement with the two adjacent sides of the facing corners in the ladder legs. The flexible straps 78 bring the serrations (not shown) of the mounting portion into full contact with the ladder leg.

A similar handle accessory to the handle 71 of FIG. 12 may be used to aid in the carrying of scaffolding 80 (FIG. 14). Due to the telescoping nature of scaffolding, by which alternate members 83 form channels in which adjacent members 79 travel, leaving small gaps 84 for "play" by which the telescoping movement is easier to accomplish. The flexible strap 82 is fitted about an outside member 83 or 79, as desired, passing through gap 84. Because of its relatively small thickness, the strap 82 will not interfere with the telescoping movement of the scaffolding 80, nor will it present a safety problem which would cause the worker to trip on the accessory, as it presents a low profile when mounted on the scaffolding 80. Tightening the strap to size secures the handle accessory 81 in a desired position for easy cartage.

A handle which is adaptable to a wide variety of implements and for use from different angles of approach is handle accessory 85, shown in FIG. 15. The three handle grips 81, 86 and 88 allow the angle of approach or use by the tool operator to be varied according to the tool. Due to the serrations (not shown) on the underside of the mounting portion 99, the handle 85 will tightly engage a shaft of a tool or the surface of another implement when bound to it by a flexible strap about the indentations 89.

As shown in FIG. 16, a handle accessory may also be adapted to an oar 90 of a rowboat. As shown in FIG. 18, the initial grip area 91 of an oar 90 is somewhat oval in shape. However, the handle 92 can still conform to the oar grip 91 by means of the flexible straps 93 about the indentations 94.

Handgrips 97 for bikes, wheelbarrows and the like may also be formed from the handle accessory of the subject invention (FIG. 17). The mounting portion 98 is brought into close contact with the grip area 95 of the bike or wheelbarrow by the flexible straps 96.

A review of FIGS. 8-18 and the above discussion demonstrates that by the combination of the serrated mounting portion, the flexible straps which are adjustable to any desired diameter and the rigid, though conformable mounting portion. The handle accessory of the subject invention may be adapted for use to alleviate muscle strain and make any lifting or push-pull operation easier and more comfortable regardless of the tool or work to be done. In addition, the facility with which the position of the handle accessory may be changed with just a screwdriver should the original position be found undesirable, encourages readjustment until a comfortable position is found. Such readjustment may be by tilting or sliding up and down the shaft. Should a child wish to use an adult's tool, the handle may be easily repositioned to best aid and encourage the child in the use of the tool.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A detachable lightweight handle useful as an accessory on work tools and utensils having straight or tapered element portions to assist, facilitate and reduce stress in the use of such tools, including:
   an elongated mounting portion for securing said handle to said element of a tool at any desired point therealong;
   said mounting portion including a flexible element-engaging section comformable to the taper and change in diameter of said element and in contact with substantially less than one-half the circumference of said element;
   said element-engaging section having serrations on a side adjacent said element for gripping said element; and,
   a central channel of a greater depth than said serrations for permitting controlled flexing of said element-engaging section for greater conformance of the entire of said element-engaging section to said element;
   said element-engaging section having an upper surface portion contoured to accept a strap means;
   said element-engaging section being fixedly mounted on said element by a flexible strap means, said upper surface portion and said element combining to form a peripheral strap-engaging surface;
   said strap means conforming substantially to all of said peripheral strap-engaging surface;
   said strap means bringing said serrations into contact with said element and causing said element-engaging section to frictionally hold said element in a fixed and stable manner; whereby,
   said handle may be fixedly secured to elements of different diameters and shapes and positioned at any desired point on the element with equal stability.

2. The handle of claim 1 having a grip portion attached to said mounting portion by a second arm portion, said first and second arm portions having a mounting portion including first and second mounting portions, respectively, said first mounting portion being separate from said second mounting portion, said fastening means engaging said first and second portions to fixedly grip said shaft in a substantially immovable manner.

3. The handle of claim 1 wherein said serrations are substantially rectangular steps.

4. The handle of claim 1 wherein said central channel is rectangular in shape.

5. The handle of claim 1 wherein said element comprises a shaft of a work tool.

6. The handle of claim 5 wherein said mounting means is split into a first and second portion, said first and second portion having a first and second shaft-engaging section respectively, and a third shaft-engaging section, said strap means engaging said first, second and third shaft-engaging sections to fixedly mount said handle on a work tool.

7. The handle of claim 1 wherein at least said mounting means is formed of a fiberglass inpregnated polymer.

8. A detachable lightweight handle useful as an accessory on work tools having straight or tapered shafts, such as snow shovels, hoes, rakes and the like, to assist and facilitate in the use of such tools, including:
   mounting means to secure said handle to said shafts of said tool at any desired point therealong;
   said mounting means including at least one resilient shaft-engaging section contacting substantially less than one-half the shaft circumference conformable to said shaft;
   a central channel in said shaft-engaging section for permitting controlled flexing of said shaft-engaging section for greater conformance of the entire of said shaft-engaging section to said shaft;
   said shaft-engaging section having an upper surface portion contoured to accept a strap means;

said shaft-engaging section and said shaft forming an irregular circumference about which at least two strap attaching means are secured;

each of said strap attaching means being flexible and adjustable in size for substantial conformance to said irregular circumference for maximum contact of said shaft-engaging section with said shaft to frictionally hold said shaft and said shaft-engaging means together in a fixed and stable manner.

9. The handle of claim 8 wherein serrations are formed on said shaft-engaging section.

10. The handle of claim 9 wherein said serrations are disposed parallel to the longitudinal axis of said shaft-engaging section.

11. The handle of claim 9 wherein said serrations are disposed perpendicular to the longitudinal axis of said shaft-engaging section.

12. The handle of claim 8 having a grip portion attached to said mounting portion by a second arm portion, said first and second arm portions having a mounting portion including first and second mounting portions, respectively, said first mounting portion being separate from said second mounting portion, said fastening means engaging said first and second portions to fixedly grip said shaft in a substantially immovable manner.

* * * * *